3,505,439
MANUFACTURE OF CALCIUM SILICATE HYDRATE PRODUCTS
David R. Moorehead and James D. Smith, Roseville, New South Wales, Australia, assignors to The Colonial Sugar Refining Company Limited, Sydney, New South Wales, Australia, a company of Australia
Filed Nov. 8, 1966, Ser. No. 592,818
Claims priority, application Australia, Nov. 18, 1965, 66,715/65
Int. Cl. C04b 15/12
U.S. Cl. 264—82                                                6 Claims

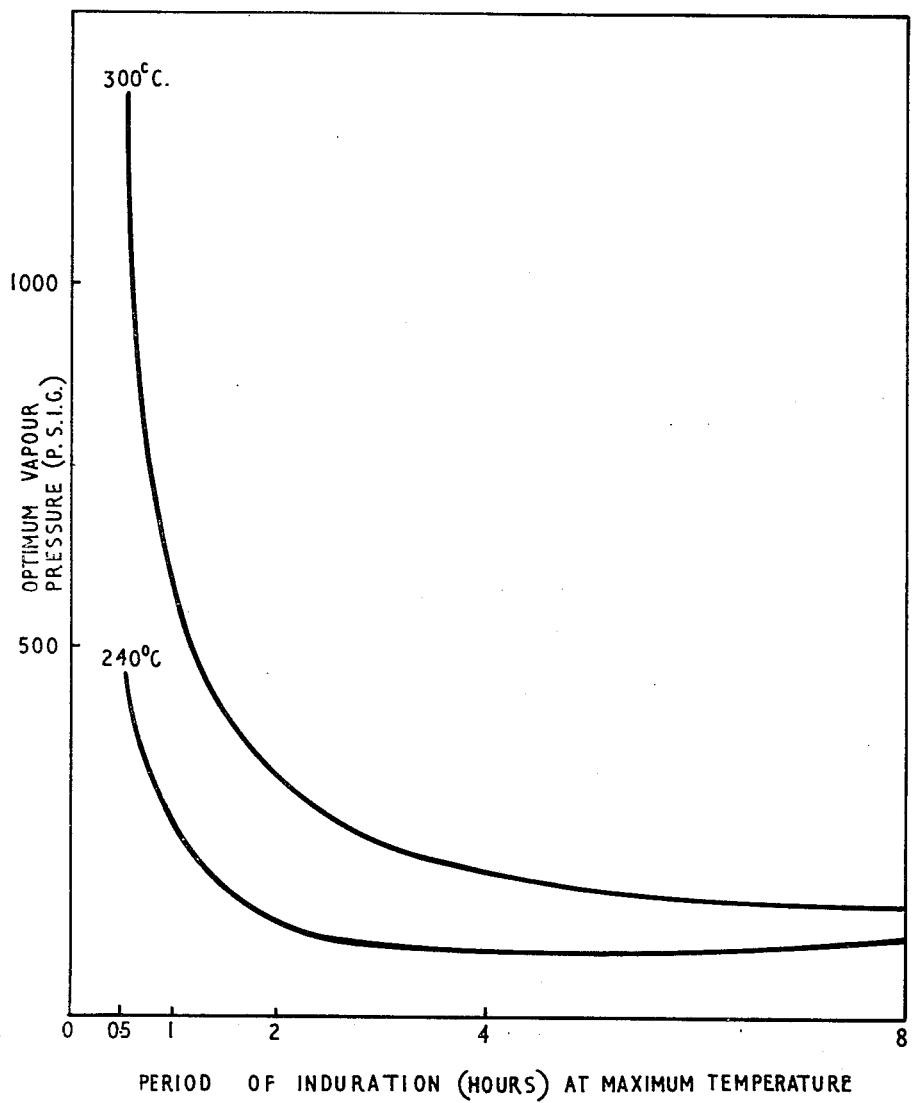
RELATIONSHIP BETWEEN VAPOUR PRESSURE AND CURING TIME FOR OPTIMUM COMPRESSIVE STRENGTH United States Patent Office 3,505,439
Patented Apr. 7, 1970

ABSTRACT OF THE DISCLOSURE

A method of manufacturing calcium silicate hydrate building, structural and paving products in which a mixture of calcareous material, siliceous material and water is cured at elevated temperature under exclusively unsaturated vapour pressure conditions.

---

This invention relates to the manufacture from calcareous and siliceous materials of building, structural and paving products in which the bonding medium comprises calcium silicate hydrates.

Strength development in these types of products depends at least partly on the formation of a polycrystalline matrix of calcium silicate hydrates enveloping the particles of residual siliceous material in the mixture and binding them together in a cemented mass.

The reaction to form calcium silicate hydrates is normally carried out by applying heat to a suitable mixture of calcareous and siliceous materials in the presence of water.

Conventional methods for the manufacture of calcium silicate hydrate products make use of an autoclave treatment for a period of induration of not less than four hours and at temperatures usually below 220° C. Products which have been made in this way include sand-lime bricks, asbestos-cement type sheets and aerated calcium silicate hydrate blocks.

By way of illustration, a known method of manufacture of asbestos-cement type sheets involves mixing asbestos fibres (usually a blend of different types), calcareous material (usually portland cement), and silica (usually ground sand) with water to form a free flowing slurry. Proportions by weight of raw materials for a typical mixture may be 15% asbestos blend, 51% portland cement and 34% ground sand. The asbestos blend may contain amosite, chrysotile and crocidolite mixed in proportions to impart optimum filtering properties to the slurry and suitable strength characteristics to the autoclaved products. The slurry is usually formed into a sheet by a continuous filtering system, and the sheet is then compacted by subjecting it to a "mangle-like" action between rolls. The compacted sheet is trimmed to size and squeezed free of excess water by pressing. It is then cured by autoclaving in saturated water vapour conditions. A typical curing cycle requires 2 hours for heating up to 170° C. and 120 pounds per square inch steam pressure, 8 hours holding at this temperature and pressure, and 2 to 3 hours for cooling and gradual reduction of pressure.

The reaction to form calcium silicate hydrates is accelerated markedly by raising the temperature and pressure, as discussed in U.S. patent application No. 389,480 (filed Aug. 13, 1964), now abandoned. It has been found, however, that the degree of strength development achieved by curing for a given period at a given elevated temperature and superatmospheric pressure is not a simple function of the degree to which the reaction is complete. For example, strength development can be attributed significantly to the interlocking of calcium silicate hydrate phases and is thus highly dependent on crystallization phenomena occurring during and immediately subsequent to the reaction.

The aforementioned patent application describes an accelerated method of making calcium silicate hydrate products, comprising curing an appropriate mixture of calcareous material, siliceous material and water for a period of induration not exceeding thirty minutes at superatmospheric pressure and at a temperature of at least 250° C. This aforementioned patent application also describes the phenomenon of strength impairment associated with curing at these elevated temperatures should the period of induration be prolonged beyond thirty minutes.

When calculated in terms of increased output, the economic advantages of accelerated curing are obvious. However, saturated vapour pressure increases rapidly with temperature (see Table 1, which gives approximate saturated water vapour pressures corresponding to various temperatures), hence the high-temperature method of the aforementioned patent application can only be practised at saturated vapour pressures when suitable high pressure autoclaving equipment is available. Since the cost of such equipment increases with increase in the required autoclave strength, it will be appreciated that practising this method at saturated vapour pressures may involve a capital expenditure which—at least in the short term—would offset in part the economic advantages of accelerated curing.

TABLE 1

| Temperature, ° C.: | Pressure, p.s.i. |
|---|---|
| 100 | 15 |
| 180 | 140 |
| 240 | 480 |
| 300 | 1260 |
| 350 | 2400 |

While it was suggested in this prior patent application that unsaturated vapour pressure condition could be tolerated, it was recognised that—compared with saturated vapour pressure conditions—the period of induration required for a given strength development at any given temperature would have to be correspondingly increased within the specified thirty minute period.

As noted above, the curing period limitation (maximum of thirty minutes) which is characteristic of the said patent application, derives from the discovered phenomenon of strength impairment when induration is prolonged at the temperatures in question and under saturated vapour pressure conditions. It appears that this phenomenon of strength impairment is attributable in large measure to a gradual recrystallization of calcium silicate hydrate phases to larger crystallite forms having reduced inter-particle friction. Strength impairment may also be attributed partly to the formation of gaps between siliceous particles and developing calcium silicate hydrate, i.e. it is a consequence of the progressive diffusion of silicate ions away from the surface of each grain of siliceous material.

In experiments leading to the present invention, it has become apparent that the conclusions reached in said patent application regarding strength impairment are not applicable to unsaturated vapour pressure conditions. Thus, it has now been discovered (i) that the recrystallization of calcium silicate hydrate phases and the tendency to gap formation are considerably more dependent on the presence of environmental water than was hitherto suspected and that (ii) provided that suitably unsaturated vapour pressure conditions are employed, periods of induration can be prolonged beyond thirty minutes at temperatures above 250° C. without resulting in serious strength impairment. It has also been discovered (iii) that products of satisfactory compressive strength can be formed by curing under unsaturated vapour pressure conditions at temperatures below 250° C. for periods of induration as little as thirty minutes.

The invention thus enables two kinds of economy to be achieved: the first, deriving from accelerated manufacture; the second, deriving from the possibility of using equipment of comparatively low autoclave strength. Preferably, manufacturing conditions are selected such that both kinds of economy are achieved; however, the invention also contemplates prolonged low temperature curing (for example, eight hours at 180° C.) where the only advantage lies in the use of equipment of low autoclave strength.

Broadly, the present invention provides a method of manufacturing calcium silicate hydrate building, structural and paving products, said method including:

(i) Making a mixture comprising calcareous material, siliceous material and water, (ii) Forming the mixtures into the shape of the required product, (iii) Curing the formed component mixture at an elevated temperature for a period of induration sufficient to form by reaction a cementitious material coating on the residual siliceous material, said cementitious material being selected from the group consisting of calcium silicate and calcium silicate hydrates, (iv) Returning the formed product to ambient conditions, and (v) Hydrating said calcium silicates when present to calcium silicate hydrates;

said method being characterized by the improvement that the induration at elevated temperature is conducted exclusively under unsaturated vapour pressure conditions, with the proviso that when the temperature is at least 250° C., the period of induration exceeds thirty minutes.

The building, structural and paving products of the invention are prepared from a mixture comprising three essential components (calcareous material, siliceous material, water) and, optionally, certain addenda.

THE CALCAREOUS COMPONENT

As used herein, calcareous material means any calcium-containing material which is reactive with silica under hydrothermal conditions to form calcium silicates or calcium silicate hydrates.

Conventionaly, the calcareous component consists of lime (CaO) or hydrated lime ($Ca(OH)_2$). A high quality lime having a low magnesium oxide content is desirable; and a lime which meets the A.S.T.M. specification C415–58T is suitable.

Additionally and/or alternatively, the calcareous component can consist of a material other than lime, but which, under the conditions employed, can react with silica to form calcium silicates or calcium silicate hydrates.

On this definition, it will be noted that portland cement falls into the category of calcareous material useful according to the invention. It is also possible to employ a calcareous material which is a mixture of different components (e.g. lime and portland cement).

THE SILICEOUS COMPONENT

As used herein, siliceous material means any silica-containing material which is reactive with hydrated lime under hydrothermal conditions to form calcium silicates or calcium silicate hydrates.

The siliceous component can consist of ground quartz, silica sand, sand-stone, diatomite, soil, siliceous clay, mine tailings, fly ash, furnace slag, or any other material which is reactive with hydrated lime under hydrothermal conditions to form calcium silicates or calcium silicate hydrates.

WATER

The water incorporated in the mixture should preferably be low in organic content; normally, town supply water is suitable. The water can be present as free water, or can be present in the form of a temperature-labile hydrated compound e.g. hydrated lime.

ADDENDA (1) Natural or synthetic fibrous materials commonly used for reinforcement or generally applicable as reinforcing materials in the products of the invention. Preferably, reinforcing fibres should be selected from those which will enhance the modulus of rupture of a calcium silicate hydrate matrix, and will not be brittle under conditions of stress (e.g. conditions of nailing).

Whether or not a fibre will enhance the modulus of rupture of the matrix in which it is incorporated can readily be determined by experiment. Thus, when mineral wool (Rockwool) fibres were employed to make reinforced products according to the invention, the resultant products were found to have a very low modulus of rupture or were so brittle that they fractured before their modulus could be determined.

Asbestos fibres show very good compatibility with a calcium silicate hydrate matrix and greatly enhance the strength of the products in which they are incorporated. This can be related to the fact that asbestos occurs naturally in fibre-bundles within which there may be considerable degree of "slip."

Additional reinforcement can be provided by non fibrous materials, such as steel rods, metallic mesh or gauze, fine metallic wires.

(2) Various types of additive can be incorporated in the mixture. For example, additives such as surfactants and accelerators can be used to assist in wetting the dry components and to accelerate the hardening process. A useful surfactant is, for example, a sulphonated petroleum derivative. Useful accelerators are calcium chloride and sodium hydroxide, the former increasing the availability of calcium ions in solution and the latter increasing the dissolution rate of silica.

PARTICLE SIZE AND PROPORTIONING

Preferably the specific surface area of the siliceous material is greater than 1,000 centimetres$^2$/gram, and particularly favoured surface areas are selected within the range 3,000 to 5,000 centimetres$^2$/gram.

In general, it has been found that, as the specific surface area of silica varies from 1,000 to 12,000 centimetres$^2$/gram, the optimum calcium hydroxide to silica ratio by weight varies substantially linearly from 0.2 to 1.2. Optimum strength products have been made according to the invention using finely divided hydrated lime and silica of surface area 3,500 to 5,000 centimetres$^2$/gram in the proportion by weight of 1:2 (stoichiometric excess of silica).

The proportion of water required in the autoclave is dictated by the desired unsaturated vapour pressure. If the desired unsaturated vapour pressure is very low (e.g. equal to 1 atmosphere) and if a temperature-labile hydrated compound is present, the reaction can be effected in the absence of added water. In this case, as will be illustrated, the water essential for the reaction must be derived from the temperature-labile compound by heating.

MIXING AND COMMINUTION

The mixing of the component materials can be done in any number of ways. For example, the calcareous and siliceous components can be mixed together first and then a quantity of water can be added. When the calcareous component is calcium oxide, its heat of hydration can thereby be preserved and the product will be pre-heated to some extent before autoclaving. This treatment may also result in a development of desirable "green" strength.

In other cases, where grinding of the siliceous component and/or calcareous component is required, the materials including water can be mixed conveniently in a ball mill.

FORMING OR MOULDING

This operation can be done by pressing the component mixture of the required shape (e.g. brick, block, sheet—flat or corrugated) in a hydraulically operated press. For compacting pressures in the range 10,000 to 20,000 pounds per square inch the density of the product is practically independent of compacting pressure variation. Such pressures are accordingly very suitable in practice, where small differences in compacting pressure will not result in non-uniformity of products.

Alternatively—if sufficiently plastic—the component mixture can be extruded (e.g. as pipes, shaped beams, sheets; or as a continuous column from which sections can be cut). Lubricating additives can be included if necessary in the component mixture to make it sufficiently plastic for extrusion forming.

It has been indicated previously that the present invention contemplates periods of induration ranging from as little as, say, thirty minutes to as long as, say, eight hours. When the period of induration is selected from the lower end of this range (thirty minutes to one hour) it is possible to manufacture calcium silicate hydrate products by combining the operations of forming and curing. It is possible, for example, to perform the operations of forming and curing substantially simultaneously by using a heated platen press, and satisfactorily strong calcium silicate hydrate products have been prepared in this manner.

We have shown that the hydrothermal formation of calcium silicate hydrates appears to proceed by reaction between calcareous and siliceous materials dissolved in an aqueous phase. The presence of at least a layer of adsorbed water is therefore required on the surfaces of reactant particles before reaction can occur. Under saturated vapour pressure conditions, the pores of a formed component mixture are usually filled with condensed water, and the minimum requirement for reaction is therefore readily met. Under unsaturated vapour pressure conditions, the quantity of water available is reduced and the reaction therefore proceeds at a slower rate. However, compensating for this effect, the reaction rate can be increased again by raising the curing temperature. Thus, while the invention is not limited to curing at temperatures above a given minimum, it is to be expected that it will find its greatest application in curing at temperatures of the order of 250° C. and above.

The particular methods described hereunder all relate to the production of solid calcium silicate hydrate cylinders of diameter 0.625 inch and of height 0.75 inch.

METHOD 1

Crushed quartz (measured effective surface area of 4,700 centimetres$^2$/gram) and finely divided hydrated lime were mixed (proportions of 2:1 by weight) with 7% water (based on total air-dry weight of quartz and lime). The damp mix was pressed into cylindrical form by means of a hydraulic press at 15,000 pounds/square inch. Samples of the compacted mix were transferred to an autoclave in which the vapour pressure could be controlled, and there heated within 15 minutes to a maximum of 180° C. at respectively 100%, 80%, 50% and 25% saturated vapour pressure (S.V.P.) Some of the samples were then cured under these respective conditions for 4 hours, and the remainder of the samples were cured under these respective conditions for 8 hours. Cooling to below 100° C. was effected within about the same period of time as heating to the maximum temperature.

METHOD 2

Crushed quartz (measured effective surface area of 4,700 centimeters$^2$/gram) and finely divided portland cement were mixed (proportions of 3:7 by weight) with 12% water (based on total air-dry weight of quartz and cement). The damp mix was stored in a sealed container for 24 hours (to allow preliminary hydration and expansion of the cement) and was then compressed into cylindrical form by means of a hydraulic press at 15,000 pounds/square inch. Samples of the compacted mix were autoclaved and cooled in the manner described under Method 1.

The products of Methods 1 and 2 were tested for compressive strength, and the results are given in Tables 2 and 3.

Compresive strength results show variations within batches as well as between batches. In all the tables hereunder each quoted result is the average of results determined for at least three separate products prepared from a single batch of the appropriate damp mix (i.e. quartz/hydrated lime or quartz/portland cement).

TABLE 2 (QUARTZ/HYDRATED LIME)

| Vapour pressure | | Compressive strength (p.s.i.) of products cured at 180° C. for— | |
|---|---|---|---|
| Percent S.V.P. | P.s.i. | 4 hours | 8 hours |
| 100 | 140 | 32,800 | 34,750 |
| 80 | 112 | 21,700 | 25,300 |
| 50 | 70 | 13,300 | 26,550 |
| 25 | 35 | 10,330 | 13,000 |

TABLE 3 (QUARTZ/PORTLAND CEMENT)

| Vapour pressure | | Compressive strength (p.s.i.) of products cured at 180° C. for— | |
|---|---|---|---|
| Percent S.V.P. | P.s.i. | 4 hours | 8 hours |
| 100 | 140 | 28,900 | 30,110 |
| 80 | 112 | 9,800 | 10,610 |
| 50 | 70 | 9,000 | 13,920 |
| 25 | 35 | 6,950 | 14,550 |

While it is clear from these results that the compressive strengths of calcium silicate hydrate products are in all cases reduced by curing at 180° C. under unsaturated vapour pressure conditions, it is nonetheless true that the lower compressive strengths of such products (even when cured at the minimum tested pressure of 35 p.s.i.) are still more than adequate to meet demands normally made of cementitious building materials. This is especially true in the case where the calcareous component is hydrated lime.

METHOD 3

Samples of compacted damp mix were prepared as in Method 1 (quartz/hydrated lime) and were then transferred to an autoclave in which the vapour pressure could be controlled. They were heated within twenty minutes to a maximum of 300° C. at respectively 50% and 25% saturated vapour pressure. Some of the samples were then cured under these respective conditions for 1 hour, while other samples were cured under these respective conditions for 2 hours and still other samples were cured under these respective conditions for 4 hours. Cooling to below 100° C. was effected within about the same period of time as heating the maximum temperature.

METHOD 4

Samples of compacted damp mix were prepared as in Method 2 (quartz/portland cement) and were then autoclaved and cooled in the manner described under Method 3.

The products of Methods 3 and 4 were tested for compressive strength, and the results are given in Tables 4 and 5 respectively.

TABLE 4 (QUARTZ/HYDRATED LIME)

| Vapour pressure | | Compressive strength (p.s.i.) of products cured at 300° C. for— | | |
|---|---|---|---|---|
| Percent S.V.P. | P.s.i. | 1 hour | 2 hours | 4 hours |
| 50 | 630 | 24,700 | 17,850 | 15,720 |
| 25 | 315 | 22,080 | 19,700 | 23,530 |

TABLE 5 (QUARTZ/PORTLAND CEMENT)

| Vapour pressure | | Compressive strength (p.s.i.) of products cured at 300° C. for— | | |
|---|---|---|---|---|
| Percent S.V.P. | P.s.i. | 1 hour | 2 hours | 4 hours |
| 50 | 630 | 16,050 | 13,600 | 13,400 |
| 25 | 315 | 10,660 | 13,600 | 13,240 |

It is seen that the compressive strengths given in Tables 4 and 5 (where the maximum temperature is 300° C.) are all superior to the corresponding compressive strengths respectively given in Tables 2 and 3 (where the maximum curing temperature is 180° C.). From this evidence it is clear that there is no phenomenon of strength impairment associated with prolonged curing (4 hours) at 300° C. under the described unsaturated vapour pressure conditions.

METHOD 5

Samples of compacted damp mix were prepared as in Method 1 (quartz/hydrated lime) and were then transferred to an autoclave in which the vapour pressure could be controlled. Some of the compacts were heated within 15 minutes to a maximum of 240° C. while other compacts were heated within 20 minutes to a maximum of 300° C. Vapour pressure varied from 50% to 6.25% of saturated vapour pressure at the respective maximum temperature, and curing under these conditions was carried out in each case for thirty minutes. Cooling to below 100° C. was effected within about the same period of time respectively as heating to the maximum temperature.

The products were tested for compressive strength, and the results are given in Table 6.

TABLE 6 (QUARTZ/HYDRATED LIME)

| | Compressive strength of products cured for 30 minutes at — | |
|---|---|---|
| | 240° C. | 300° C. |
| Percent S.V.P.: | | |
| 50 | 11,495 | 22,846 |
| 25 | 7,659 | 18,452 |
| 12.5 | 3,431 | 16,170 |
| 6.25 | 3,734 | 11,319 |

From this table it is seen that a significant advantage is to be gained by increasing the maximum curing temperature from 240° C. to 300° C. Thus, compressive strengths of the same order (c. 11,500 p.s.i.) can be obtained by curing for half an hour at 300° C. and 6.25% saturated vapour pressure (i.e. 79 p.s.i.g.) as by curing for half an hour at 240° C. and 50% saturated vapour pressure (i.e. 240 p.s.i.g.).

Generally speaking, it appears that the compressive strength of a hydrothermally formed calcium silicate hydrate product is impaired if the applied vapour pressure during induration at a given temperature is greater than a time-dependent optimum. This strength impairment is most marked when the period of induration exceeds one hour. It may be attributed largely to the fact that an increase in vapour pressure at any given temperature is associated with an increased liquid phase, thus facilitatnig recrystallization of calcium silicate hydrate phases to crystallites reduced in number and having reduced interparticle friction.

METHOD 6

Compacts of damp mix were prepared and cured as in Method 5 (300° C.), but for selected different periods of induration.

The products were tested for compressive strength and the results are given in Table 7.

TABLE 7 (QUARTZ/HYDRATED LIME)

| Vapour pressure | | Compressive strength of products cured at 300° C. for (hours)— | | | |
|---|---|---|---|---|---|
| Percent S.V.P. | P.S.I. | 1 | 2 | 4 | 8 |
| 50 | 630 | 23,198 | 17,017 | 14,155 | 13,591 |
| 25 | 315 | 21,725 | 21,281 | 18,478 | 122805 |
| 12.5 | 157.5 | 17,643 | 15,498 | 19,609 | 24,442 |
| 6.25 | 78.75 | 12,357 | 11,063 | 9,950 | 12,251 |

Maximum compressive strengths for periods of induration of 1, 2, 4, 8 hours are seen from these data (underlined) to occur at 50%, 25%, 12.5%, 12.5% saturated vapour pressure respectively.

The data in Table 7 thus confirm that the optimum vapour pressure is time-dependent, an increasing period of induration being associated with a decreasing optimum vapour pressure.

This effect is illustrated more clearly by the annexed drawing where graphs are given showing the variation of optimum vapour pressure with variation of the period of induration at respectively 240° C. and 300° C. (products prepared as in Method 5).

As a consequence of the principles noted above, it follows that optimum strength development during prolonged curing at high temperature can only be achieved when unsaturated vapour pressure conditions are employed.

Preferred manufacturing conditions would involve short periods of curing and low vapour pressure. For any given curing temperature, these are clearly incompatible requirements. In practice, therefore, optimum manufacturing conditions must be a compromise determined by available autoclaving equipment and desired rate of throughput.

Liquid water cannot exist above the critical temperature (about 374° C.). Above this temperature, therefore, the reaction between calcareous and siliceous materials—while still dependent on the presence of water—takes place in the gaseous phase. As the pressure is reduced at elevated temperatures above the critical temperature, a solid state surface reaction appears to occur additionally and progressively and this reaction generally results in the formation of anhydrous calcium silicates which can be hydrated subsequently to form calcium silicate hydrates.

In all the examples hitherto given, water has been incorporated as a separate component in the calcareous/siliceous material mixture.

We have found however that—provided the calcareous material comprises a temperature-labile hydrated compound, say calcium hydroxide—it is possible to form a cementitious bonding matrix by autoclaving a dry material mixture at elevated temperatures.

The water component essential for reaction is derived in this case by thermal decomposition of calcium hydroxide. Since this dehydration does not occur significantly at temperatures below 580° C., it is clear that autoclaving temperatures needed for practising this form of the invention must be of the order of at least 500° to 600° C.

METHOD 7

Crushed quartz (measured effective surface area of 4,700 centimetres$^2$/gram) and finely divided hydrated lime were mixed together (proportions of 2:1 by weight) and the dry mixture was pressed into cylindrical form by means of a hydraulic press at 13,000 pounds/square inch. The compacted mixture was transferred to a tube which, after sealing, was heated within 7 minutes to 600° C. and maintained at that temperature for ½, 1, or 2 hours. The vapour pressure prevailing in the tube was determined only by the dehydration of calcium hydroxide. Cooling to below 100° C. was effected within about 10 minutes. The calcium silicate products so formed had compressive strengths of the order of only 2,000 p.s.i., and the compressive strengths given in Table 8 relate to the products when hydrated by immersing in boiling water for 24 hours.

TABLE 8

| Period of induration (hours) at 600° C.: | Compressive strength (p.s.i.) |
|---|---|
| ½ | 5,600 |
| 1 | 5,600 |
| 2 | 5,700 |

It appears that calcium oxide (formed by dehydration) reacts under these conditions with silica to form $\gamma$—$C_2S$, a major constituent of cement. The presence of the latter in the pre-hydration product has been confirmed by X-ray diffraction methods.

$\gamma$—$C_2S$ can be hydrated to give a bonding calcium silicate hydrate, and it is to be expected therefore that compressive strengths of products prepared in the described manner from a dry calcareous/siliceous mixture can be significantly improved by allowing subsequent hydration to occur.

By way of further illustration, a sample compact of dry calcareous/siliceous mixture was prepared as described in Method 7 and was found to have an initial compressive strength of 1,920 pounds per square inch. After curing in steam (atmospheric pressure) at 500° C. for 24 hours, the compressive strength of the resulting product was only 2,200 pounds per square inch, and the compressive strength was not improved by maintaining these conditions for 10 days.

After immersing the cured product in boiling water for 24 hours, the compressive strength was found to have increased to 7,370 pounds per square inch.

It is apparent, therefore, that calcium silicate hydrate products of moderately high compressive strength can be prepared by applying the method of the invention at a vapour pressure of no more than 1 atmosphere pressure and then submitting the formed products to hydration.

What is claimed is:

1. A method of manufacturing calcium silicate hydrate building, structural and paving products, said method including:
   (a) making a damp mixture of calcareous material, siliceous material and water; the calcareous material consisting of finely divided calcium hydroxide, the siliceous material consisting of crushed quartz of specific surface area selected within the range 3,000 to 5,000 centimetres²/gram, and the ratio by weight of siliceous material to calcareous material being 2:1;
   (b) forming the damp mixture into the shape of the required product at a hydraulic pressure within the range 10,000 to 20,000 pounds per square inch;
   (c) transferring the formed damp mixture to an autoclave;
   (d) heating the formed damp mixture in the autoclave within 20 minutes to a maximum temperature of 300° C.;
   (e) maintaining the maximum temperature for a period of induration of at least one hour under a vapour pressure not greater than 630 pounds per square inch, the period of induration being about one hour when the vapor pressure is about 630 pounds per square inch, about two hours when the vapour pressure is about 315 pounds per square inch, about four hours when the vapour pressure is about 157.5 pounds per square inch, and about 8 hours when the vapour pressure is about 78.75 pounds per square inch; and
   (f) returning the formed product to below 100° C., within a further 20 minutes.

2. A method according to claim 1, wherein the mixture additionally comprises reinforcing material.

3. A method according to claim 1, wherein the reinforcing material is asbestos.

4. A method according to claim 1, wherein the operations of forming and curing are conducted in a heated platen press.

5. A method according the claim 1, wherein the operations of forming and curing are conducted in a heated extrusion die.

6. A method according to claim 1, wherein the operations of forming and curing are conducted substantially simultaneously.

References Cited

UNITED STATES PATENTS

| 2,215,891 | 9/1940 | Thomson | 106—120 |
| 2,534,303 | 12/1950 | Serinis. | |
| 2,665,996 | 1/1954 | Kalousek | 106—120 |
| 2,699,097 | 1/1955 | Binkley | 106—120 X |
| 2,858,227 | 10/1958 | Rodsky | 106—97 |
| 3,226,242 | 12/1965 | Huettemann | 106—98 |
| 3,231,657 | 1/1966 | Kalousek | 264—333 |
| 3,317,643 | 5/1967 | Denny | 106—120 X |

FOREIGN PATENTS 1,127,270  4/1962  Germany.

OTHER REFERENCES

Bozhenov et al., Fourth International Symposium on the Chemistry of Cement, 1960, pp. 327–347.

ROBERT F. WHITE, Primary Examiner

N. RUSHEFSKY, Assistant Examiner

U.S. Cl. X.R.

106—120; 264—234, 333